(12) United States Patent
Mizutani et al.

(10) Patent No.: US 8,844,300 B2
(45) Date of Patent: Sep. 30, 2014

(54) REFRIGERANT PIPE WASHING METHOD, AIR CONDITIONER UPDATING METHOD, AND AIR CONDITIONER

(75) Inventors: Kazuhide Mizutani, Sakai (JP); Hiromune Matsuoka, Sakai (JP); Atsushi Yoshimi, Sakai (JP); Manabu Yoshimi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 1548 days.

(21) Appl. No.: 10/521,020

(22) PCT Filed: Feb. 4, 2004

(86) PCT No.: PCT/JP2004/001148
§ 371 (c)(1),
(2), (4) Date: Jan. 12, 2005

(87) PCT Pub. No.: WO2004/070293
PCT Pub. Date: Aug. 19, 2004

(65) Prior Publication Data
US 2005/0198994 A1 Sep. 15, 2005

(30) Foreign Application Priority Data
Feb. 7, 2003 (JP) ................. 2003-030312

(51) Int. Cl.
*C09K 5/04* (2006.01)
*F25B 45/00* (2006.01)

(52) U.S. Cl.
CPC .............. *F25B 45/00* (2013.01); *C09K 5/045* (2013.01); *F25B 2400/18* (2013.01)
USPC .............................. 62/114; 62/149

(58) Field of Classification Search
CPC ...... F25B 9/00; F25B 45/00; F25B 2345/002; F25B 2345/001; C09K 5/045; C09K 5/044
USPC ............. 62/84, 85, 114, 149, 159, 468, 474, 62/475, 77, 303
See application file for complete search history.

(56) References Cited

U.S. PATENT DOCUMENTS 4,014,181 A * 3/1977 Burger .......................... 62/114
5,086,630 A * 2/1992 Van Steenburgh, Jr. ........ 62/475
(Continued)

FOREIGN PATENT DOCUMENTS

EP          0787958 A1 * 8/1997
JP          07-83545 A    3/1995
(Continued)

OTHER PUBLICATIONS

Edited by Japan Society of Refrigerating and Air Conditioning Engineers, "Jokyu Hyojun Text Reito Kucho Gijutsu Reitochen Dai 3 ji Kitei", Japan Society of Refrigerating and Air Conditioning Engineers, Jul. 31, 2000, p. 77.

(Continued)

*Primary Examiner* — Mohammad M Ali
(74) *Attorney, Agent, or Firm* — Global IP Counselors (57) ABSTRACT

A method is disclosed that makes it possible to reduce the amount of refrigerant used and shorten the amount of time over which the new air conditioner must be run in a refrigerant pipe washing mode when an air conditioner that used a mineral-oil-based refrigerant oil is updated to or replaced with an air conditioner using an HFC refrigerant as the working refrigerant and the existing refrigerant piping is reused as is. Thus, the existing refrigerant piping of the air conditioner that used a mineral-oil-based refrigerant oil is reused in the air conditioner that uses an HFC refrigerant as the working refrigerant, the by washing the refrigerant piping using a cleaning agent comprising an HFC refrigerant containing at least 40 wt % of R32 to remove residual refrigerant oil in the refrigerant piping.

5 Claims, 5 Drawing Sheets

(56) References Cited

U.S. PATENT DOCUMENTS

| | | | | |
|---|---|---|---|---|
| 5,415,003 A | * | 5/1995 | Bertva et al. | 62/85 |
| 5,495,057 A | * | 2/1996 | Nam et al. | 570/167 |
| 5,806,329 A | * | 9/1998 | Taira et al. | 62/149 |
| 6,189,322 B1 | | 2/2001 | Ishihara et al. | |
| 6,321,542 B1 | * | 11/2001 | Ueno et al. | 62/77 |
| 7,003,980 B2 | * | 2/2006 | Taira | 62/498 |
| 7,178,347 B2 | * | 2/2007 | Taira et al. | 62/84 |
| 2003/0057397 A1 | | 3/2003 | Taira | |

FOREIGN PATENT DOCUMENTS

| | | | |
|---|---|---|---|
| JP | 8-94216 A | * | 4/1996 |
| JP | 11-325621 A | | 11/1999 |
| JP | 2001-041613 A | | 2/2001 |
| JP | 2001-41613 A | | 2/2001 |
| JP | 3149640 B | | 3/2001 |
| JP | 2001-141340 A | | 5/2001 |
| JP | 2001-174110 A | | 6/2001 |
| JP | 2001-181660 A | | 7/2001 |
| JP | 2002-181417 A | | 6/2002 |
| JP | 2002-250576 A | | 9/2002 |
| JP | 3361765 B | | 10/2002 |
| JP | 2002-357377 A | | 12/2002 |

OTHER PUBLICATIONS

European Search Report of corresponding EP Application No. 04 70 8045.2 dated Sep. 24, 2010.

* cited by examiner

REFRIGERANT PIPE WASHING METHOD, AIR CONDITIONER UPDATING METHOD, AND AIR CONDITIONER

TECHNICAL FIELD

The present invention relates to a refrigerant pipe washing method, an air conditioner updating method, and an air conditioner.

BACKGROUND ART

One example of a conventional air conditioner is the air conditioners used to condition the air of office buildings. This kind of air conditioner includes chiefly a heat source unit having a compressor and a heat-source-side heat exchanger, a user unit having a user-side heat exchanger, and gaseous refrigerant piping and liquid refrigerant piping for connecting said units together. In view of such environmental concerns as destruction of the ozone layer, HFC (hydrofluorocarbon) refrigerants have come to be used as the working refrigerant in such air conditioners.

When air conditioners in existing buildings are updated or replaced, the existing gaseous refrigerant piping and liquid refrigerant piping is sometimes reused as is in order to reduce the cost and time required for the replacement work. In such cases, the air conditioner installation work proceeds chiefly according to the following steps:
<1> Recover refrigerant
<2> Install equipment
<3> Install piping and wiring (reuse existing gaseous refrigerant piping and liquid refrigerant piping)
<4> Pull vacuuming
<5> Charge system with refrigerant With this work procedure, the work time can be reduced chiefly by simplifying the piping and wiring work.

However, debris, oil, and other residual contaminants that remain in existing gaseous refrigerant pipes and liquid refrigerant pipes must be removed by cleaning the piping before running the air conditioner in the normal fashion. More particularly, if the existing air conditioner used a CFC (chlorofluorocarbon) or HCFC (hydro-chlorofluorocarbon) refrigerant as the working refrigerant, old refrigerant oil for the CFC (chlorofluorocarbon) or HCFC (hydro-chlorofluorocarbon) refrigerant will remain in the existing gaseous refrigerant piping and liquid refrigerant piping. Consequently, the old refrigerant oil will not be compatible with the new refrigerant oil for the HFC refrigerant and will behave as a contaminant in the refrigerant circuit, possibly clogging expansion valves and capillaries in the refrigerant circuit and damaging the compressor.

The refrigerant oils used for the conventional CFC and HCFC refrigerants are naphthene-based mineral oils and other non-polar oils. Conversely, the oils used for the newer HFC and HC refrigerants are ester-based and ether-based mineral oils and other polar oils. Consequently, if refrigerant oil for a CFC or HCFC refrigerant remains in the piping, the solubility of the refrigerant oil in the working refrigerant will change and the proper refrigeration performance will not be obtained from the HFC refrigerant. Thus, it is also necessary to clean the refrigerant piping in view of this issue of refrigerant oil compatibility.

Several refrigerant pipe washing methods have been proposed that enable existing gaseous refrigerant piping and liquid refrigerant piping to be reused when an air conditioner is updated or replaced.

One such method uses an HCFC refrigerant (e.g., HCFC141b and HCFC225) in which mineral-oil-based refrigerant oils have a high solubility as a cleaning agent.

A second method uses repeated batch washing with an HFC refrigerant after the heat source unit and user unit have been replaced (Japanese Patent Registration No. 3149640).

A third method involves providing an oil collecting device in the refrigerant circuit in addition to updating the heat source unit and user unit and washing the existing refrigerant piping by operating the air conditioner in a mode that circulates the new HFC refrigerant (Japanese Patent Registration No. 3361765 and Japanese Laid-Open Patent Publication No. 2001-41613).

The first refrigerant pipe washing method washes in a highly effective manner because it uses an HCFC refrigerant in which the mineral-oil-based residual refrigerant oil has a high solubility, but it should not be used in view of such environmental concerns as destruction of the ozone layer.

The second refrigerant pipe washing method is environmentally friendly because it uses an HFC refrigerant, but the requirement of repeated batch washings consumes a large quantity of refrigerant and makes the method uneconomical.

The third refrigerant pipe washing method eliminates the need for repeated batch washings because it enables continuous washing with an operating mode that circulates the refrigerant. Thus, the method is economical in that it can reduce the amount of refrigerant used.

However, if the new heat source unit and user unit use R407C or R134a as the working refrigerant, the third refrigerant pipe washing method will not be very effective at cleaning the refrigerant pipes because mineral-oil-based refrigerant oils have a low solubility in R407C and R134a. Consequently, the quantity of refrigerant circulated and the time spent in the pipe washing mode will both tend to increase. This issue also applies to the second refrigerant pipe washing method in that the number of batch washings and the amount of refrigerant used in each batch increases due to the poor solubility.

SUMMARY OF THE INVENTION

The object of the present invention is to make it possible to reduce the amount of refrigerant used and shorten the amount of time over which the new air conditioner must be run in a refrigerant pipe washing mode when an air conditioner that used a mineral-oil-based refrigerant oil is updated to or replaced with an air conditioner using an HFC refrigerant as the working refrigerant and the existing refrigerant piping is reused as is.

According to a first aspect of the present invention, a refrigerant pipe washing method is proposed for when an air conditioner that used a mineral-oil-based refrigerant oil is updated to or replaced with an air conditioner using an HFC refrigerant as the working refrigerant and the existing refrigerant piping is to be reused as is. The residual refrigerant oil in the refrigerant piping is removed by washing the refrigerant piping using a cleaning agent comprising an HFC refrigerant containing at least 40 wt % of R32.

This refrigerant pipe washing method uses an HFC refrigerant containing 40 wt % or more of R32 as a cleaning agent. R32 is a refrigerant that is contained in R407C (composition: 23 wt % of R32, 25 wt % of R125, and 52 wt % of R134a), which is often used as a substitute for the HCFC refrigerant R22.

HFC refrigerants are generally thought have a low solubility with respect to mineral-oil-based refrigerant oils and, thus, are believed to be incapable of providing sufficient cleaning action to wash refrigerant pipes containing residues of such oils. Likewise, R32 is not believed to have a high capacity for cleaning refrigerant pipes. However, the present inventors have discovered experimentally that a larger cleaning effect can be obtained when refrigerant pipes containing residual mineral-oil-based refrigerant oils are washed using an HFC refrigerant containing at least 40 wt % of R32 than when the same are washed using R407C or another HFC refrigerant having a small R32 content.

As a result, it is possible to reduce the amount of refrigerant used and shorten the amount of time over which the air conditioner must be run in a refrigerant pipe washing mode when a conventional refrigerant pipe washing method is used, such as a method in which repeated batch washings are performed using an HFC refrigerant or a method in which an oil collecting device is provided in the refrigerant circuit and the air conditioner is operated in a mode that circulates an HFC refrigerant.

According to a second aspect of the present invention, the refrigerant pipe washing method of the first aspect of the present invention is provided such that the cleaning agent is in a wet state and the refrigerant piping is washed by flushing it with the cleaning agent.

With this refrigerant pipe washing method, the cleaning effect is increased further because the refrigerant piping is flushed with a cleaning agent in a wet state, which enables the cleaning agent to mix readily with the residual mineral-oil-based refrigerant oil remaining in the refrigerant piping. As a result, the amount of refrigerant used can be reduced and the amount of time over which the air conditioner must be run in a refrigerant pipe washing mode can be shortened.

According to a third aspect of the present invention, the refrigerant pipe washing method of the first or second aspects of the present invention is provided such that the cleaning agent does not contain any R134a.

With this refrigerant pipe cleaning method, the cleaning effect is improved further because the cleaning agent contains at least 40 wt % of R32 and does not contain any R134a and the improved cleaning effect can contribute to reducing the amount of refrigerant used and shortening the amount of time over which the air conditioner must be run in a pipe washing mode.

According to a fourth aspect of the present invention, the refrigerant pipe washing method of any one of the first to fourth aspects of the present invention is provided such that the cleaning agent contains only components that are contained in the working refrigerant that will be used when the air conditioner update is complete.

With this refrigerant pipe washing method, the work associated with replacing the cleaning agent with the working refrigerant is simplified because refrigerant components that are not contained in the working refrigerant will not remain in the refrigerant piping after washing.

According to a fifth aspect of the present invention, an air conditioner updating method is proposed whereby at least a portion of the equipment constituting an existing air conditioner is updated or replaced while the refrigerant piping of the existing air conditioner, i.e., the existing refrigerant piping, is reused as is, the method including the following steps: a refrigerant recovery step, an equipment updating step, a refrigerant charging step, and a pipe washing step. In the refrigerant recovery step, the working refrigerant containing the existing refrigerant oil, i.e., a mineral-oil-based refrigerant oil, is recovered from the existing air conditioner. In the equipment updating step, at least a portion of the equipment constituting the existing air conditioner is updated or replaced. In the refrigerant charging step, the air conditioner with the equipment replaced is charged with a working refrigerant comprising an HFC refrigerant containing at least 40 wt % of R32. In the pipe washing step, the working refrigerant charged in the refrigerant charging step is circulated and existing refrigerant oil remaining in the existing refrigerant piping is carried along with the working refrigerant. The existing refrigerant oil is then separated from the working refrigerant in order to remove it from the existing refrigerant piping.

Since this air conditioner updating method uses an HFC refrigerant containing 40 wt % or more of R32 as the working refrigerant, a large cleaning effect can be obtained even if the working refrigerant is used as the cleaning agent, thus making it possible to shorten the amount of time over which the air conditioner is run in a refrigerant pipe washing mode.

According to a sixth aspect of the present invention, the air conditioner updating method of the fifth aspect of the present invention is provided such that during the pipe washing step, the working refrigerant is circulated in such a manner that working refrigerant in a wet state flows through the existing refrigerant piping.

With this air conditioner updating method, the cleaning effect is increased further because the refrigerant piping is flushed with a cleaning agent, i.e., the working refrigerant, in a wet state, which enables the cleaning agent to mix readily with the residual mineral-oil-based refrigerant oil remaining in the refrigerant piping. The improved cleaning effect contributes to shortening the amount of time over which the air conditioner must be run in a refrigerant pipe washing mode.

According to a seventh aspect of the present invention, an air conditioner is provided that is obtained by updating or replacing at least a portion of the equipment of an existing air conditioner and changing the working refrigerant to an HFC refrigerant, the air conditioner comprises existing refrigerant piping, a heat source unit, a user unit, and an oil collecting device. The existing refrigerant piping was used with the existing air conditioner and contains residue of the existing refrigerant oil, i.e., a mineral-oil-based refrigerant oil. The heat source unit and user unit are connected together by the existing refrigerant piping. The oil collecting device is configured such that after the working refrigerant has been changed and before the air conditioner is run in a normal operating mode, the oil collecting device can draw in working refrigerant that is being circulated through the air conditioner and separate the existing refrigerant oil that is carried with the working refrigerant. The replaced working refrigerant is an HFC refrigerant containing at least 40 wt % of R32.

This air conditioner uses an HFC refrigerant containing 40 wt % or more of R32 as the working refrigerant. Therefore, the existing refrigerant oil remaining in the existing refrigerant piping can be fed into the oil collecting device and separated/removed with a large cleaning effect when the air conditioner is run in a mode in which the working refrigerant is circulated as a cleaning agent before the air conditioner is run in a normal operating mode. As a result, the amount of time over which the air conditioner is run in a refrigerant pipe washing mode can be shortened.

DETAILED DESCRIPTION OF THE PREFERRED-EMBODIMENTS OF THE INVENTION

Embodiments of the present invention will now be described with reference to the drawings.

<First Embodiment>

(1) Constituent Features of the Existing Air Conditioner

<1> Overall Configuration

Figure 1:
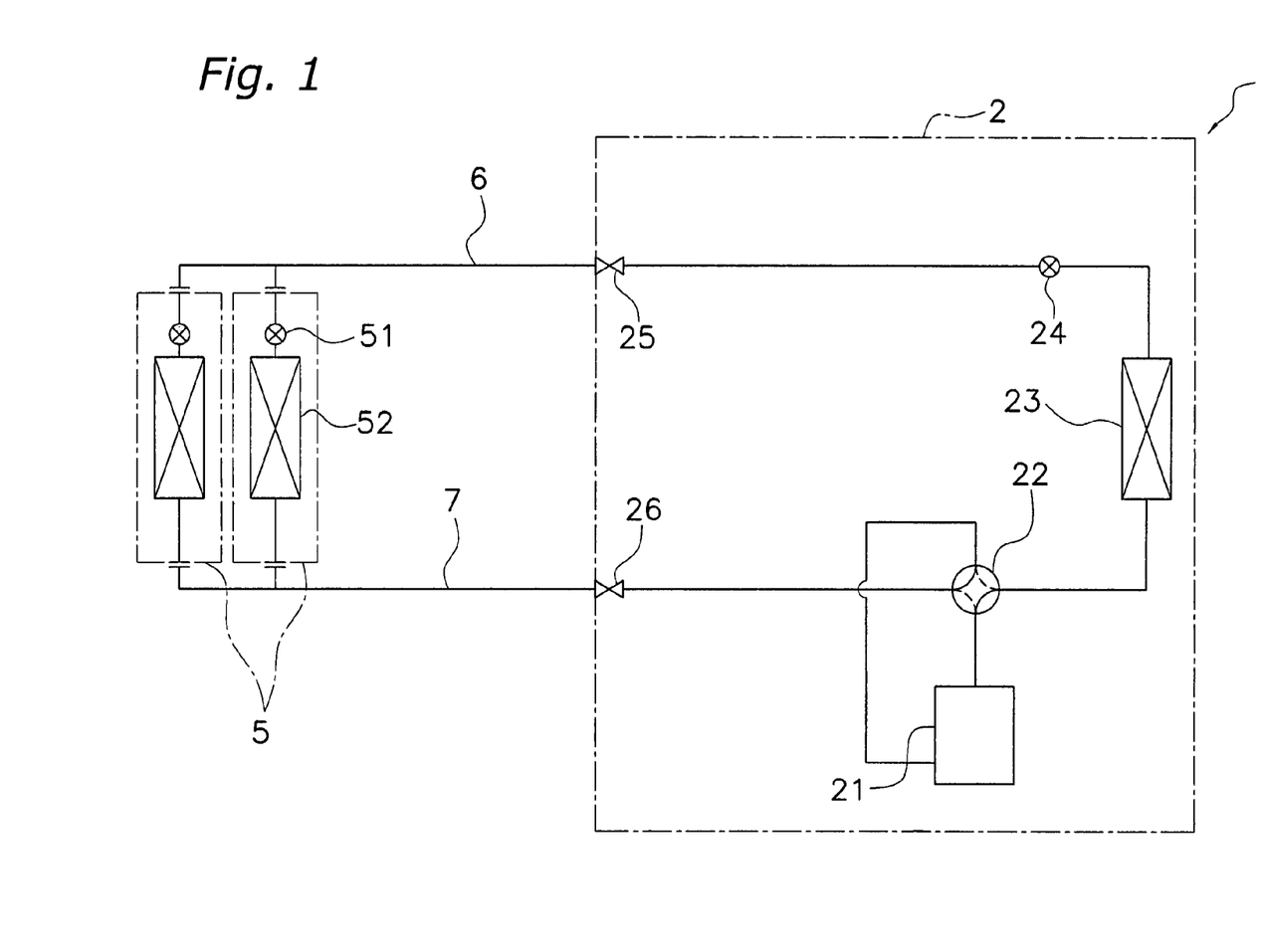
FIG. 1 is a schematic view of an existing air conditioner in accordance with the first and second embodiments of the present invention.

FIG. 1 is a schematic view of the refrigerant circuit of an existing air conditioner 1. The air conditioner 1 is designed to perform air conditioning, e.g., heating and cooling, of an office building or other building and is equipped with the following: one heat source unit 2; a plurality of user units 5 (two in this embodiment) connected in parallel; and a liquid refrigerant pipe 6 and gaseous refrigerant pipe 7 connecting the heat source unit 2 and the user units 5 together.

<2> Heat Source Unit

The heat source unit 2 is configured to be installed on the roof of a building and is equipped chiefly with a compressor 21, a four-way selector valve 22, a heat-source-side heat exchanger 23, and a heat-source-side expansion valve 24, a liquid refrigerant shut-off valve 25, a gaseous refrigerant shut-off valve 26, and refrigerant piping connecting these components together.

The compressor 21 is a device for drawing in gaseous refrigerant and compressing it. The four-way selector valve 22 is configured such that it can change the flow direction of the refrigerant when the air conditioner is switched between cooling mode and heating mode. During cooling mode, it connects the discharge side of the compressor 21 to the gas side of the heat-source-side heat exchanger 23 and connects the intake side of the compressor 21 to the gaseous refrigerant shut-off valve 26. Meanwhile, during heating mode, it connects the discharge side of the compressor 21 to the gaseous refrigerant shut-off valve 26 and connects the intake side of the compressor 21 to the gas side of the heat-source-side heat exchanger 23. The heat-source-side heat exchanger 23 is a heat exchanger for evaporating or condensing the refrigerant using air or water as a heat source. The heat-source-side expansion valve 24 is provided on the liquid side of the heat-source-side heat exchanger 23 and serves to regulate the pressure and flow rate of refrigerant. The liquid refrigerant shut-off valve 25 and the gaseous refrigerant shut-off valve 26 are connected to the liquid refrigerant pipe 6 and the gaseous refrigerant pipe 7, respectively.

<3> User Unit

The user units 5 are installed in different locations inside the building and each is equipped chiefly with a user-side expansion valve 51, a user-side heat exchanger 52, and refrigerant piping connecting these components together.

The user-side heat exchanger 52 is a heat exchanger for evaporating or condensing the refrigerant in order to cool or heat the indoor air. The user-side expansion valve 51 is provided on the liquid side of the user-side heat exchanger 52 and serves to regulate the pressure and flow rate of refrigerant.

<4> Refrigerant Piping

The liquid refrigerant pipe 6 and the gaseous refrigerant pipe 7 are refrigerant pipes connecting the heat-source unit 2 to the user units 5 and the bulk of these pipes is arranged in the building inside the walls and above the ceilings. The liquid refrigerant pipe 6 and the gaseous refrigerant pipe 7 also correspond to the refrigerant piping called "existing refrigerant piping," which is the minimum refrigerant piping that is reused as is when the air conditioner 1 is updated.

(2) Operation of the Existing Air Conditioner

The operation of the existing air conditioner 1 will now be described using FIG. 1.

<1> Cooling Mode

During cooling mode, the four-way selector valve 22 is in the state indicated with solid lines in FIG. 1, i.e., in such a state that the discharge side of the compressor 21 is connected to the gas side of the heat-source-side heat exchanger 23 and the intake side of the compressor 21 is connected to the gaseous refrigerant shut-off valve 26. Also, the liquid refrigerant shut-off valve 25, the gaseous refrigerant shut-off valve 26, and the heat-source-side expansion valve 24 are opened and the opening degree of the user-side expansion valves 51 is adjusted to reduce the pressure of the refrigerant.

When the refrigerant circuit in this state and the compressor 21 of the heat source unit 2 is started, the working refrigerant is drawn into the compressor 21, compressed, and sent through the four-way selector valve 22 to the heat-source-side heat exchanger 23, where it is condensed into liquid refrigerant. This liquid refrigerant passes through the heat-source-side expansion valve 24, the liquid refrigerant shut-off valve 25, and the liquid refrigerant pipe 6 and flows to the user units 5. Then, the pressure of the liquid refrigerant is reduced by the user-side expansion valves 51 and the refrigerant evaporates in the user-side heat exchangers 52 while cooling the indoor air. As a result of the evaporation, the refrigerant becomes gaseous refrigerant. This gaseous refrigerant passes through the gaseous refrigerant pipe 7, the gaseous refrigerant shut-off valve 26, and the four-way selector valve 22 and is again drawn into the compressor 21. In this way, the air conditioner operates in cooling mode.

<2> Heating Mode

During heating mode, the four-way selector valve 22 is in the state indicated with broken lines in FIG. 1, i.e., in such a state that the discharge side of the compressor 21 is connected to the gaseous refrigerant shut-off valve 26 and the intake side of the compressor 21 is connected to the gas side of the heat-source-side heat exchanger 23. Also, the liquid refrigerant shut-off valve 25, the gaseous refrigerant shut-off valve 26, and the user-side expansion valve 51 are opened and the opening degree of the heat-source-side expansion valve 24 is adjusted to reduce the pressure of the refrigerant.

When the refrigerant circuit in this state and the compressor 21 of the heat source unit 2 is started, the working refrigerant is drawn into the compressor 21, compressed, and sent through the four-way selector valve 22, the gaseous refrigerant shut-off valve 26, and the gaseous refrigerant pipe 7 to user units 5. The gaseous refrigerant condenses inside the user-side heat exchangers 52 while heating the indoor air and changes to a liquid state or a gas-liquid two phase state. This liquid refrigerant or gas-liquid two phase refrigerant passes through the user-side expansion valves 51 and the liquid refrigerant pipe 6 and flows to the heat source unit 2. The liquid refrigerant is pressure-reduced by the heat-source-side expansion valve 24 and evaporates inside the heat-source-side heat exchanger 23. The gaseous refrigerant exiting the heat-source-side heat exchanger 23 passes through the four-way selector valve 22 and is again drawn into the compressor 21. In this way, the air conditioner operates in heating mode.

(3) Updating the Existing Air Conditioner

<1> Regarding the Refrigerant and Refrigerant Oil Used in the Existing Air Conditioner As described above, when the air conditioner 1 is operating in an air conditioning mode, the working refrigerant circulates through the user units 5, the heat source unit 2, and the refrigerant pipes 6, 7. Refrigerant oil used to lubricate the compressor 21 is charged into the refrigerant circuit along with the working refrigerant and a portion of the refrigerant oil mixes with the working refrigerant and circulates through the refrigerant circuit along with the working refrigerant.

The working refrigerant used in the existing air conditioner 1 is a CFC or HCFC refrigerant and the refrigerant oil used is a mineral-oil-based refrigerant oil (hereinafter called "existing refrigerant oil"). As a result of operating in cooling and heating mode as described previously, mineral-oil-based refrigerant oil remains in the user units 5, heat source unit 2, and refrigerant pipes 6, 7 of the existing air conditioner 1 before it is updated.

Figure 3:
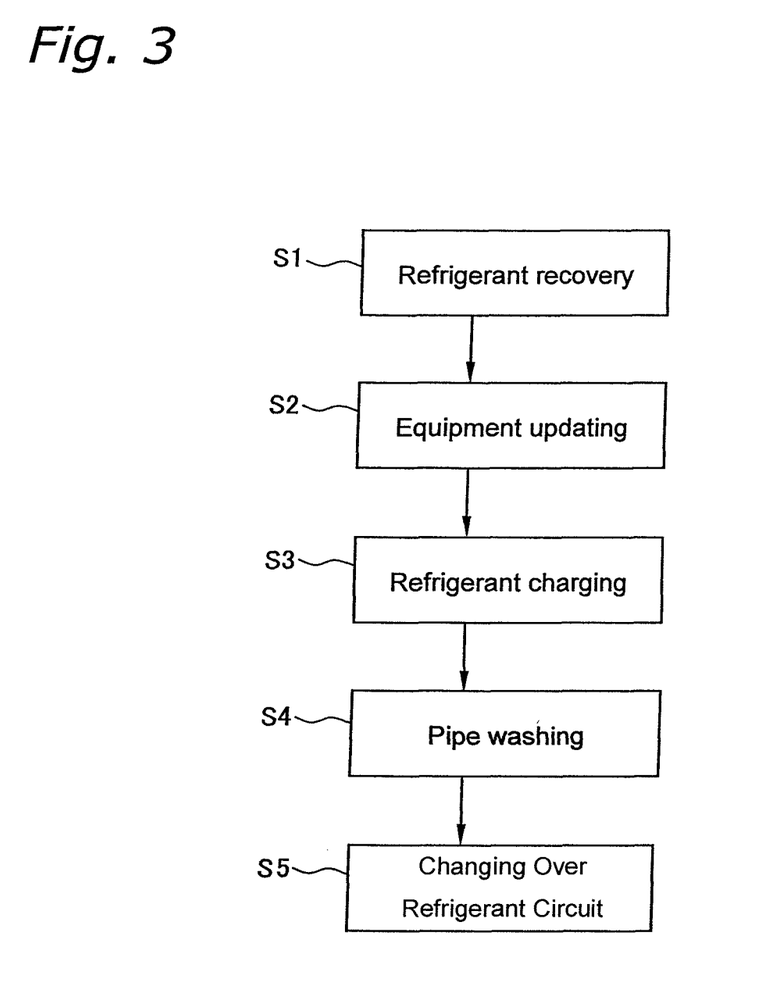
FIG. 3 is a flowchart showing the steps of an air conditioner updating method in accordance with the first embodiment of the present invention.

<2> Changing the Working Refrigerant and Updating the User Units and Heat Source Unit The method of changing the working refrigerant to the HFC refrigerant R410A (composition: 50 wt % of R32 and 50 wt % of R125) and replacing the user units 5 and heat source unit 2 of the existing air conditioner 1 with user units 105 and a heat source unit 102 while reusing the existing refrigerant piping, i.e., the refrigerant pipes 6, 7, as is will now be described with reference to FIG. 3.

<Refrigerant Recovery Step S1>

First the refrigerant circuit of the existing air conditioner 1 is pumped down in order to recover the working refrigerant and the existing refrigerant oil contained in the working refrigerant. More specifically, the liquid refrigerant shut-off valve 25 of the heat source unit 2 is closed and the air conditioner is run in the same manner as during cooling mode to force the working refrigerant (which contains existing refrigerant oil) into the heat source unit 2. Afterwards, the gaseous refrigerant shut-off valve 26 is closed, the cooling mode operation is terminated, and the working refrigerant (which contains existing refrigerant oil) is collected in the heat source unit 2.

<Equipment Updating Step S2>

Figure 2:
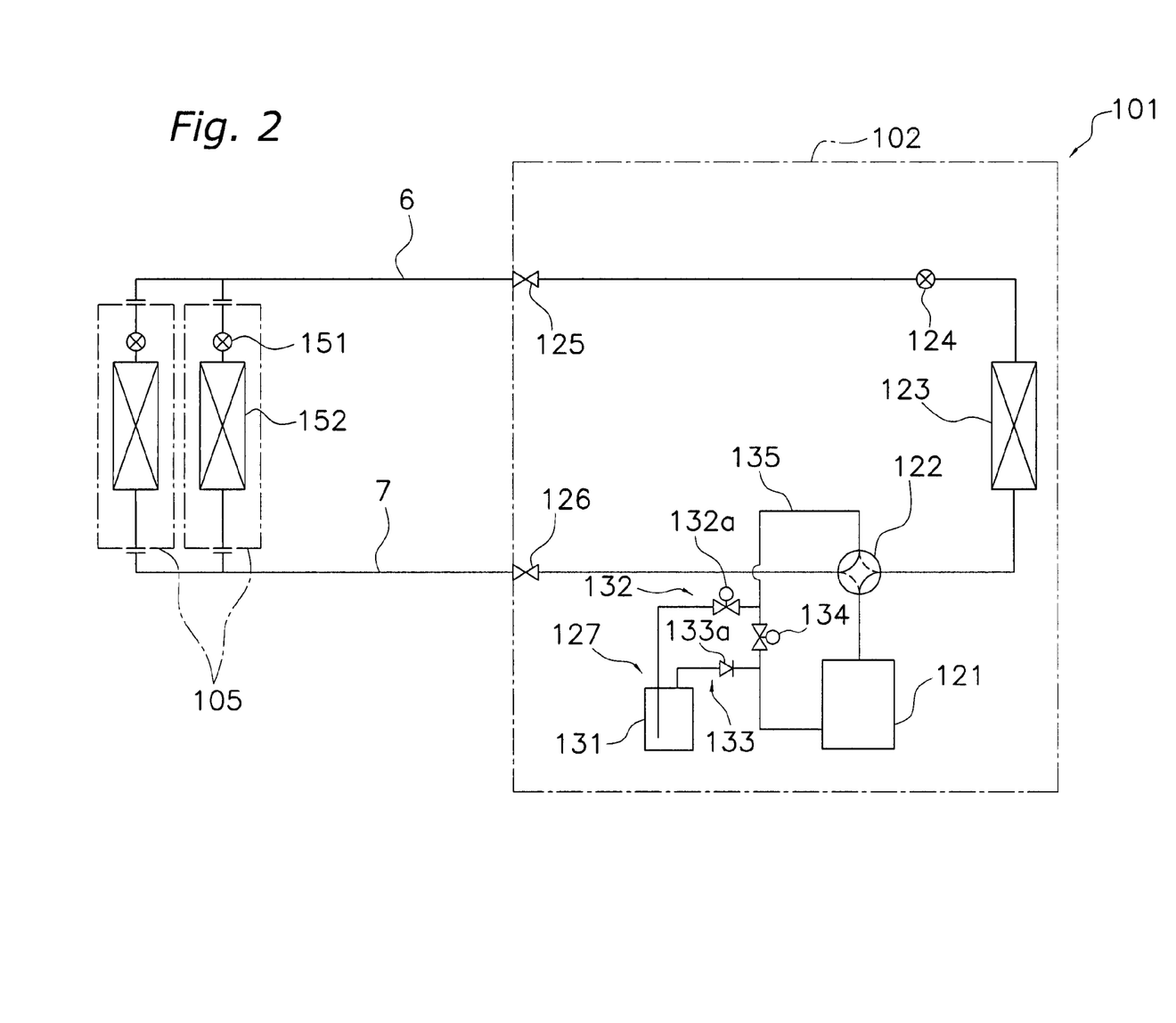
FIG. 2 is a schematic view of an updated air conditioner in accordance with the first and second embodiments of the present invention.

As shown in FIG. 2, the user units 5 and the heat source unit 2 are replaced with user units 105 and a heat source unit 102.

Similarly to the existing heat source unit 2, the new heat source unit 102 comprises chiefly a compressor 121, a four-way selector valve 122, a heat-source-side heat exchanger 123, and a heat-source-side expansion valve 124, a liquid refrigerant shut-off valve 125, a gaseous refrigerant shut-off valve 126, and refrigerant piping connecting these components.

As shown in FIG. 2, the heat source unit 102 is further provided with an oil collecting device 127. The oil collecting device 127 is a device serving chiefly to collect the existing refrigerant oil that was used with the CFC refrigerant or HCFC refrigerant used in the existing air conditioner 1 and remains in the existing liquid refrigerant pipe 6 and gaseous refrigerant pipe 7, which will be reused as is with the updated air conditioner. In this embodiment, the oil collecting device 127 is installed inside the heat source unit 102 and is provided in an intake pipe 135 of the compressor 121, which connects the four-way selector valve 122 to the intake side of the compressor 121. In this embodiment, the oil collecting device 127 comprises an oil collecting container 131, an inlet pipe 132 including an inlet valve 132a, an outlet pipe 133 including a check valve 133a, and a bypass valve 134.

The oil collecting container 131 is connected to the intake pipe 135 through the inlet pipe 132 and the outlet pipe 133 and is configured such that it can separate existing refrigerant oil from the working refrigerant flowing in the intake pipe 135 when the working refrigerant, which is also used as cleaning agent, is directed through it. Serving to direct refrigerant to the oil collecting container 131, the inlet pipe 132 branches from the intake pipe 135, and connects to the inlet of the oil collecting container 131. The inlet pipe 132 extends into the oil collecting container 131. Serving to return working refrigerant from which the existing refrigerant oil has been separated by the oil collecting container 131 to the intake pipe 135, the outlet pipe 133 branches from the intake pipe 135 at a position downstream of where the inlet pipe 132 branches and connects to the outlet of the oil collecting container 131. The bypass valve 134 is arranged such that it can shut off the flow of working refrigerant between the part of the intake pipe 135 where the inlet pipe 132 branches therefrom and the part of the intake pipe 135 where the outlet pipe 133 branches therefrom.

Similarly to the existing user units 5, the user units 105 each comprise chiefly a user-side expansion valve 151, a user-side heat exchanger 152, and refrigerant piping connecting these components together.

<Refrigerant Charging Step S3>

The liquid refrigerant shut-off valve 125 and gaseous refrigerant shut-off valve 126 of the heat source unit 102 are closed and a vacuum is pulled on the user units 105 and the refrigerant pipes 6, 7. Then, the liquid refrigerant shut-off valve 125 and gaseous refrigerant shut-off valve 126 of the heat source unit 102 are opened and working refrigerant (R410A) that contains refrigerant oil and has already been charged into the heat source unit 102 is allowed to fill the entire updated air conditioner 101. There are cases in which the existing refrigerant pipes 6, 7 are long and cannot be charged with the required amount of refrigerant using only the amount of refrigerant that the heat source unit 102 is charged with in advance. In such cases, additional refrigerant can be charged from an external source. In this embodiment, an ester-based or ether-based refrigerant oil that is compatible with R410A and other HFC refrigerants is used as the refrigerant oil contained in the working refrigerant being charged.

<Pipe Washing Step S4>

Now, pipe washing mode will be explained. The air conditioner 101 replaces the heat source unit 2 and the user units 5 with the heat source unit 102 and the user units 105 while reusing the existing liquid refrigerant pipe 6 and gaseous refrigerant pipe 7 as existing refrigerant piping. Consequently, after the installation work is completed, the debris, oil, and existing refrigerant oil that remain as contaminants in the existing refrigerant piping must be separated and removed from the refrigerant circuit before running the air conditioner in a normal operating mode. The pipe washing mode discussed here involves washing the entire refrigerant circuit of the air conditioner 101 using the working refrigerant, i.e., R410A, as a cleaning agent and using the oil collecting device 127 to collect the existing refrigerant oil remaining in the refrigerant circuit.

First, the air conditioner 101 is put into a state in which the oil collecting device 127 can be used. That is, the bypass valve 134 is closed and the inlet valve 132a is opened to configure the circuit such that the refrigerant is directed into the oil collecting container 131 when the system is run.

Then, the air conditioner 101 is run in the same manner as in the previously described cooling mode. Since the circuit has been configured to use the oil collecting device 127, the working refrigerant flowing through the intake pipe 135 passes through the oil collecting device 127 before being drawn into the compressor 121. Consequently, the working refrigerant flows into the oil collecting device 127 together with debris that remained in various places throughout the refrigerant circuit and residual existing refrigerant oil that remained in the liquid refrigerant pipe 6 and the gaseous refrigerant pipe 7. The contaminant-containing working refrigerant passes through the inlet pipe 132 and is guided by the extended inlet pipe 132 to the bottom of the oil collecting container 131. The existing refrigerant oil and other contaminants accompanying the working refrigerant collect in the bottom of the oil collecting container 131 and only decontaminated working refrigerant is returned to the intake pipe 135 through the outlet pipe 133 and drawn into the compressor 121.

During the pipe washing mode, it is also acceptable to increase the opening degrees of the user-side expansion valves 151 to a larger opening than during normal cooling mode operation so that the pressure of the pressure-reduced refrigerant is increased to a pressure close to the saturation pressure and the refrigerant enters a wet state (two phase of part gas and part liquid). Since the refrigerant flowing through the gaseous refrigerant pipe 7 is in a wet state, the existing refrigerant oil remaining in the gaseous refrigerant pipe 7 mixes more readily with the liquid working refrigerant and the cleaning effect is improved. Also, liquid working refrigerant flows into the oil collecting container 131 together with the existing refrigerant oil. As a result, the existing refrigerant oil and liquid working refrigerant collect in the bottom of the oil collecting container 131 and only the gaseous refrigerant from which the existing refrigerant oil and liquid refrigerant have been separated is returned to the intake pipe 135 through the outlet pipe 133 and drawn into the compressor 121.

After the air conditioner 101 has been run in pipe washing mode for a prescribed amount of time, the air conditioner 101 is put into a state in which the oil collecting device 127 is not used. That is, the bypass valve 134 is opened and the inlet valve 132a is closed to configure the refrigerant circuit such that the working refrigerant bypasses the oil collecting container 131 (i.e., refrigerant circuit is changed over to the normal operation state in a step S5 after the step S4 as shown in FIG. 3).

<3> Experimental Testing of Pipe Washing Mode

Based on the assumption of an air conditioner that has been updated as described heretofore, the cleaning effects obtained by operating the air conditioner in a pipe washing mode using various HFC refrigerants as the cleaning agent were investigated experimentally. The results of the experimental testing will now be described.

The experimental testing was conducted by connecting together a user unit and a heat source unit prepared for the purpose of the test with refrigerant piping, charging the refrigerant piping with a mineral oil and a test HFC refrigerant, running the system in a circulation mode as described previously, and measuring the amount of residual mineral oil.

The experimental conditions were as follows: 500 cc of mineral oil were put into the refrigerant piping in advance and the compressor of the heat source unit was operated such that the test HFC refrigerant circulated at a flow rate of approximately 300 L/min. The user-side expansion valve of the user unit was adjusted such that the dryness fraction of the refrigerant in the intake pipe of the compressor was approximately 0.9. The test HFC refrigerants used were mixtures of R32 and R125 (four different mixtures) and R407C.

Figure 4:
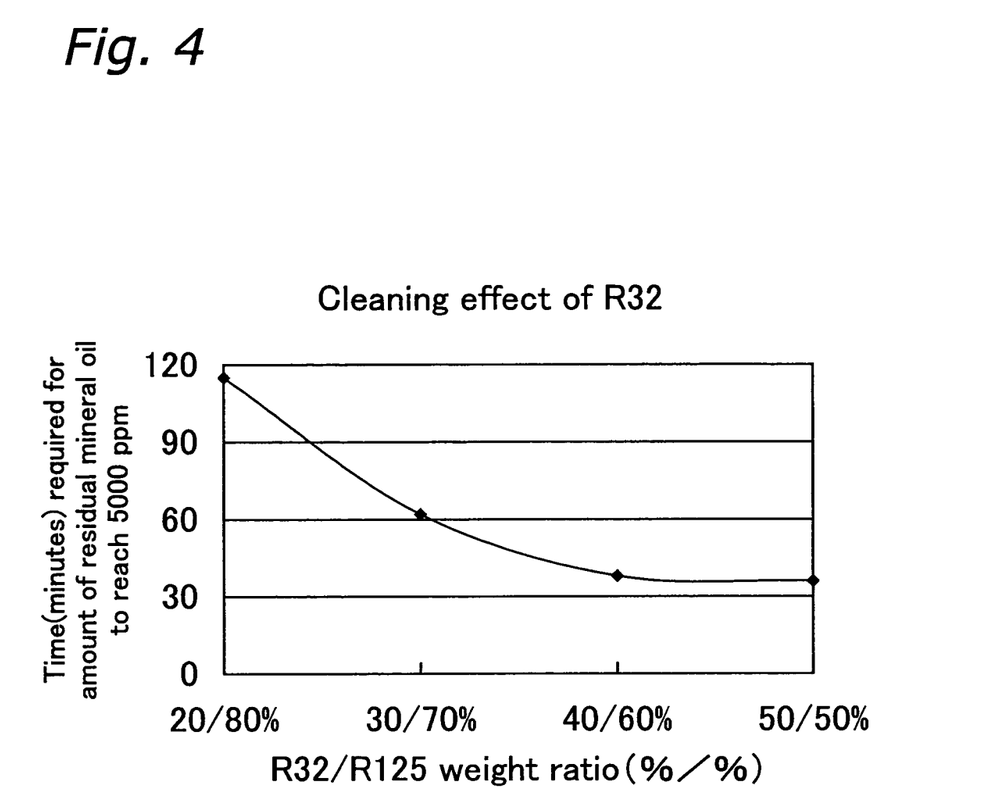
FIG. 4 is a graph showing the cleaning effect of R32.

FIG. 4 is a graph showing the results obtained when the washing mode run time required for the amount of mineral oil to reach 5000 ppm was measured experimentally for each of the test refrigerants that comprise a mixture of R32 and R125 (four different mixtures). The amount of residual mineral oil is indicated as the concentration of mineral oil with respect to the new refrigerant oil that is charged into the refrigerant circuit together with the new working refrigerant after the air conditioner is updated. As shown in FIG. 4, it was found that the run time required for the amount of residual mineral oil to reach or fall below 5000 ppm tends to increase as the content of R32 decreases and decrease as the content of R32 increases. Moreover, it was found that the run time required for the amount of residual mineral oil to reach or fall below 5000 ppm tends to level off and become substantially fixed at approximately 35 to 40 minutes when the content of R32 is 40 wt % and higher.

Thus, it can be understood that the refrigerant pipe cleaning effect increases as the content of R32 increases and a cleaning effect that is both large and stable can be obtained when an HFC refrigerant having an R32 content of 40 wt % or higher is used.

Although excluded from FIG. 4, the washing mode run time required for the amount of residual mineral oil to reach or fall below 5000 ppm was 136 minutes when R407C was used as the test refrigerant. Thus R407C was found to require a longer run time and have a poorer cleaning effect than the refrigerant having an R32 content of 20 wt % (FIG. 4). Before the experimental testing was conducted, it was hypothesized that the run time for R407C would be equal to the run time (approximately 90 minutes) obtained with an R32 content of 23 wt % according to FIG. 4 because the content of R32 in R407C is 23%. However, as just described, it was found that the run time was markedly longer and the cleaning effect as markedly poorer than anticipated based on FIG. 4. The reason for this result is not clear, but it is believed that this result is caused by the fact that R407C contains 52 wt % of R134a. Thus, in order to obtain a large cleaning effect, it is apparently preferable to use an HFC refrigerant that does not contain R134a.

(4) Characteristic Features of the Air Conditioner Updating Method

An air conditioner updating method in accordance with this embodiment—whereby an existing air conditioner 1 is updated to an air conditioner 101 that uses an HFC refrigerant as the working refrigerant while reusing the existing refrigerant pipes 6, 7—provides the following characteristic features.

<1> This air conditioner updating method is designed such that, in the pipe washing step, an HFC refrigerant (more specifically, R410A) containing 40 wt % or more of R32 is used as the cleaning agent. As a result, as described above regarding the experimental test results, a large cleaning effect can be obtained and the amount of time over which the air conditioner is run in a pipe washing mode can be shortened.

Additionally, the cleaning effect is improved further because the cleaning agent (e.g., R410A) contains at least 40 wt % of R32 and does not contain any R134a and the improved cleaning effect can contribute to reducing the amount of refrigerant used and shortening the amount of time over which the air conditioner must be run in a pipe washing mode.

Additionally, since the refrigerant used as the cleaning agent during the pipe washing mode is the same as the working refrigerant of the updated air conditioner 101, i.e., the refrigerant R410A, there is no need to change the refrigerant again after washing the refrigerant pipes. Thus, an air conditioner updating method in accordance with this embodiment can contribute to shortening the overall work time associated with updating the air conditioner.

<2> The updated air conditioner 101 uses an HFC refrigerant containing 40 wt % or more of R32 as the working refrigerant. Therefore, the existing refrigerant oil remaining in the existing refrigerant pipe 6, 7 can be fed into the oil collecting device 127 and separated/removed with a high cleaning effect when the air conditioner is run in a mode in which the working refrigerant is circulated as a cleaning agent before the air conditioner is run in a normal operating mode. As a result, the amount of time over which the air conditioner must be run in the pipe washing mode can be shortened in comparison with a case in which R407C or another HFC refrigerant having a small R32 content is used.

In the pipe washing step, the cleaning effect is increased further because the gaseous refrigerant pipe 7 is flushed with a cleaning agent, i.e., the working refrigerant, in a wet state, which enables the cleaning agent to mix readily with the residual existing refrigerant oil remaining in the gaseous refrigerant pipe 7. The improved cleaning effect contributes to shortening the amount of time over which the air conditioner must be run in a refrigerant pipe washing mode.

<Second Embodiment>

The first embodiment presents an air conditioner updating method for a case in which an oil collecting device 127 is provided in the updated heat source unit 102 and the working refrigerant used by the updated air conditioner 101 is R410A, which contains 50 wt % of R32. Consequently, in the first embodiment, it is not necessary to prepare a separate HFC refrigerant containing at least 40 wt % of R32 as the cleaning agent. However, there are cases in which the working refrigerant used by the updated air conditioner 101 is R407C, R134a, or other refrigerant having a small cleaning effect. In such cases, it is feasible to charge the air conditioner 101 with an HFC refrigerant containing 40 wt % or more of R32 as a cleaning agent and run it in a pipe washing mode similar to that of the first embodiment before charging it with the working refrigerant.

Figure 5:
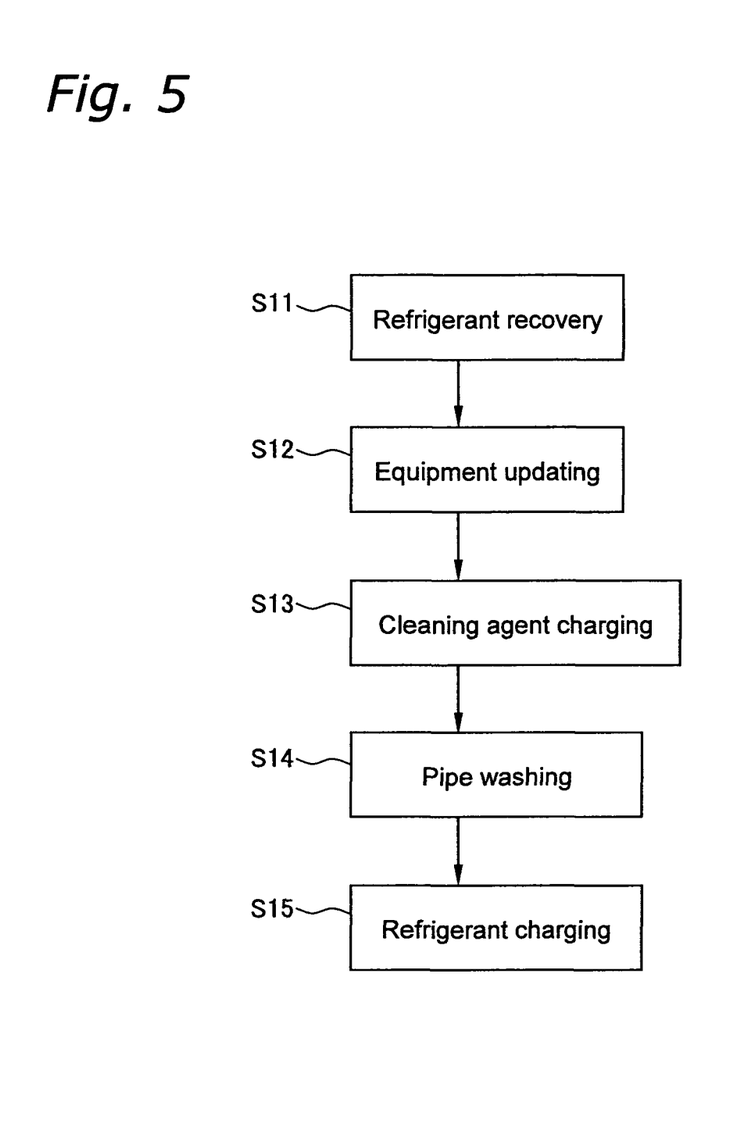
FIG. 5 is a flowchart showing the steps of an air conditioner updating method in accordance with the second embodiment of the present invention.

An air conditioner updating method in accordance with the second embodiment will now be described with reference to FIG. 5.

<Refrigerant Recovery Step S11>

Similarly to the first embodiment, the refrigerant circuit of the existing air conditioner 1 is pumped down in order to recover the working refrigerant and the existing refrigerant oil contained in the working refrigerant. More specifically, the liquid refrigerant shut-off valve 25 of the heat source unit 2 is closed and the air conditioner is run in the same manner as during cooling mode to force the working refrigerant (which contains existing refrigerant oil) into the heat source unit 2. Afterwards, the gaseous refrigerant shut-off valve 26 is closed, the cooling mode operation is terminated, and the refrigerant (which contains existing refrigerant oil) is collected in the heat source unit 2.

<Equipment Updating Step S12>

Similarly to the first embodiment, the user units 5 and the heat source unit 2 are replaced with new user units 105 and a heat source 102.

Similarly to the existing heat source unit 2, the new heat source unit 102 comprises chiefly a compressor 121, a four-way selector valve 122, a heat-source-side heat exchanger 123, and a heat-source-side expansion valve 124, a liquid refrigerant shut-off valve 125, a gaseous refrigerant shut-off valve 126, and refrigerant piping connecting these components. Similarly to the first embodiment, the heat source unit 102 is further provided with an oil collecting device 127.

<Cleaning Agent Charging Step S13>

The liquid refrigerant shut-off valve 125 and gaseous refrigerant shut-off valve 126 of the heat source unit 102 are closed and a vacuum is pulled on the user units 105 and the refrigerant pipes 6, 7. Then, the liquid refrigerant shut-off valve 125 and gaseous refrigerant shut-off valve 126 of the heat source unit 102 are opened and a cleaning agent that comprises an HFC refrigerant containing at least 40 wt % of R32 (e.g., R410A) and has already been charged into the heat source unit 102 is allowed to fill the entire updated air conditioner 101.

<Pipe Washing Step S14>

Using the same procedure as the first embodiment, the air conditioner 101 is run in a pipe washing mode whereby the cleaning agent is circulated through the refrigerant circuit.

<Refrigerant Charging Step S15>

The cleaning agent used during the pipe washing mode is discharged from the refrigerant circuit and replaced with the working refrigerant, e.g., R407C or R134a.

Even though the HFC refrigerant used as the working refrigerant after the update is completed has a small cleaning effect, the time required for washing the existing refrigerant piping can be shorted because the washing is performed using an HFC refrigerant having an R32 content of 40 wt % or higher as described previously.

Since the cleaning agent is a refrigerant containing only one component or all components of the working refrigerant that will be used when the air conditioner update is complete, like, for example, a case in which the working refrigerant used after the update is complete is R407C (composed of R32, R125, and R134a) and the cleaning agent is R410A (composed of R32 and R125), a situation in which refrigerant components not contained in the working refrigerant remain in the refrigerant piping after the washing step will not occur. As a result, the work associated with changing the refrigerant is simplified in cases where the cleaning agent and the updated working refrigerant are different.

<Other Embodiments>

Although embodiments of the present invention have been described herein with reference to the drawings, the specific constituent features are not limited to those of these embodiments and variations can be made within a scope that does not deviate from the gist of the invention.

1) In the embodiments described heretofore, an oil collecting device is provided in the updated heat source unit and the piping is washed. However, it is also acceptable if an oil collecting device is not provided and, after the old refrigerant has been recovered from the existing air conditioner, batch washings are performed repeatedly with an HFC refrigerant containing 40 wt % or more of R32 before the updated air conditioner is charged with the working refrigerant. Even though batch washings are performed, such merits as reducing the number of batch wash repetitions can be obtained.

2) The number of heat source units and the number of user units are not limited to the numbers presented in the embodiments.

3) Although the embodiments presented situations in which both the heat source unit and the user units are updated (replaced), the invention is not limited to such situations. The present invention can also be applied to situations in which only the heat source unit or only the user units are updated (replaced).

Applicability to Industry

The present invention is to make it possible to reduce the amount of refrigerant used and shorten the amount of time over which the new air conditioner must be run in a refrigerant pipe washing mode when an air conditioner that used a mineral-oil-based refrigerant oil is updated to an air conditioner using an HFC refrigerant as the working refrigerant and the existing refrigerant piping is reused as is.

What is claimed is:

1. A refurbished air conditioner comprising:

existing refrigerant piping that was used with an existing air conditioner being composed of an old heat source unit and an old user unit and contains residue of an existing mineral-oil-based refrigerant oil, the existing refrigerant piping being connected the old heat source unit and the old user unit, the existing refrigerant piping being reused as is when updating the air conditioner is complete;

a new heat source unit and a new user unit that are connected together by the existing refrigerant piping with a replaced working refrigerant disposed therein, the new heat source unit and the new user unit replacing the old heat source unit and the old user unit when updating the air conditioner is complete; and an oil collecting device that is configured such that after the existing refrigerant oil has been changed and before the refurbished air conditioner is run in a normal operating mode, the oil collecting device can draw in the replaced working refrigerant that is being circulated through the air conditioner and separate the existing refrigerant oil that is carried with the replaced working refrigerant, the oil collecting device being disposed in the new heat source unit, the oil collecting device includes an oil collecting container, an inlet pipe, an inlet valve, and an outlet pipe therein, the replaced working refrigerant being an HFC refrigerant containing at least 40 wt % of R32 that serves as a cleaning agent but contains no R134a refrigerant.

2. An air conditioner updating method comprising steps of:

a first step of recovering a working refrigerant containing an existing mineral-oil-based refrigerant oil from an existing air conditioner;

a second step of replacing selected old equipment constituting at least a portion of the existing air conditioner including an old heat source unit and an old user unit while reusing as is at least a portion of existing refrigerant piping of the existing air conditioner when updating the air conditioner is complete, the existing refrigerant piping being connected to a new heat source unit, an oil collecting device, and a new user unit, the oil collecting device being disposed in the new heat source unit when updating the air conditioner is complete, the second step being executed after the first step;

a third step of charging the existing air conditioner which is connected to the new heat source unit and the oil collecting device with the existing refrigerant piping since the second step and that has the equipment updated with a new working refrigerant that serves as a cleaning agent comprising an HFC refrigerant containing at least 40 wt % of R32 but containing no R134a refrigerant, the third step being executed after the second step; and a fourth step of washing the existing refrigerant piping of the existing air conditioner that used the existing refrigerant oil by circulating the new working refrigerant such that the existing refrigerant oil remaining in the existing refrigerant piping which is connected to the new heat source unit and the oil collecting device since the third step is carried along with the new working refrigerant during the circulating of the new working refrigerant, and separating the existing refrigerant oil from the working refrigerant in order to remove the existing refrigerant oil from the existing refrigerant piping, the fourth step being executed after the third step.

3. The conditioner updating method recited in claim 2, further comprising a fifth step of changing over a refrigerant circuit being composed of the existing refrigerant piping with the new heat source unit and the new user unit to normal operation state which has the oil collecting device attached thereto, the fifth step being executed after the fourth step.

4. The air conditioner updating method recited in claim 2, wherein during the washing of the existing refrigerant piping, the new working refrigerant is circulated such that the new working refrigerant in a wet state flows through the existing refrigerant piping.

5. The air conditioner updating method recited in claim 4, further comprising a fifth step of changing over a refrigerant circuit being composed of the existing refrigerant piping with the new heat source unit and the new user unit to normal operation state which has the oil collecting device attached thereto, the fifth step being executed after the fourth step.

* * * * *